(No Model.)
L. T. WING.
ANIMAL POKE.
No. 259,624. Patented June 13, 1882.
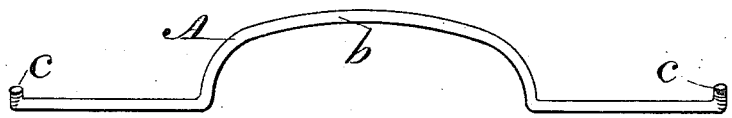
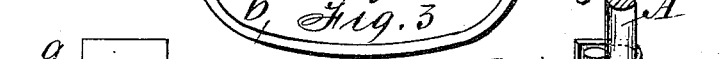
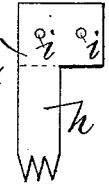
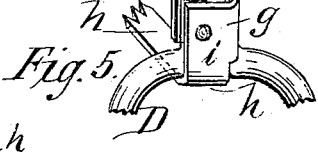
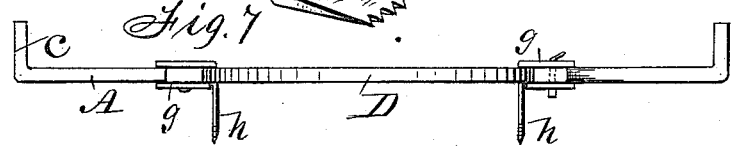
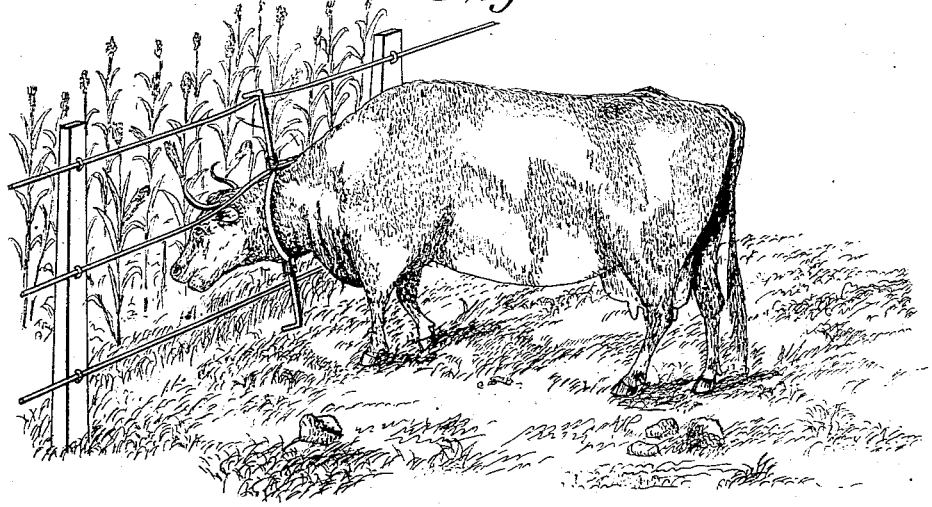
Witnesses:
C. De Vos.
Fred. Hampton.
Inventor:
Lewis T. Wing,
By Thomas G. Orwig, Att'y

UNITED STATES PATENT OFFICE.

LEWIS T. WING, OF CAMBRIDGE, IOWA.

ANIMAL-POKE.

SPECIFICATION forming part of Letters Patent No. 259,624, dated June 13, 1882.

Application filed September 15, 1881. (No model.)

*To all whom it may concern:*

Be it known that I, LEWIS T. WING, of Cambridge, in the county of Story and State of Iowa, have invented an Improved Animal-Poke, of which the following is a specification.

The object of my invention is to save the labor and expense of barbing fence-wire and to avoid the dangers and accidents incident to the use of barbed-wire fences by constructing an animal-poke with hooks on its ends in such a manner that when it is placed upon an animal's neck the hooks will engage plain fence-wires and prevent them from spreading apart when the animal attempts to pass through the fence, and by forming barbs integral with a yoke-coupling device to prick the animal wearing the yoke, and thereby cause it to desist from further efforts to break through a fence, all as hereinafter fully set forth.

Figure 1 of my drawings is a perspective view of a round metal bar about forty-five inches in length, that has a lateral bend and bow, $b$, in its middle and elbows $c\ c$ at its ends.

Fig. 2 is a half-collar, D, made of round metal, to correspond in size and form with the bow $b$ of the bar A. It has projecting and perforated ends $f\ f$.

Fig. 3 is a half-collar having an extension and hook, $c$, on one of its ends. Two uniform pieces like this may be used in place of the two distinct pieces represented by Figs. 1 and 2.

Fig. 4 is a plan view of the blank $g$, from which I form my barbed coupling devices. It is cast, cut, or stamped from plate metal by means of dies or in any suitable way. It is about two and a half inches long and one and a half inch wide, and has a corner extension, $h$, at one side, that is barbed at its end.

Fig. 5 is a perspective view, showing the plate $g$ doubled and placed upon the bar A, and to form a socket in which to fasten the perforated end of the half-collar D by passing a pin or bolt through the perforations $i\ i$.

Fig. 6 is a perspective view of a barbed coupling device cast complete in a suitable mold.

Fig. 7 is a side view of my complete device in an open position ready to be placed upon an animal's neck.

Fig. 8 is a perspective view, illustrating the application and operation of my complete invention. When thus placed upon an animal the elongated collar will cause the ends of the bar A to project vertically in opposite directions and the elbows or hooks $c$ to project forward at right angles relative to the collar and animal, and when the animal puts its head between fence wires or rails one of the hooks or elbows $c$ will come in contact with one of the wires or rails, and any pressure then made by the animal will cause the barbed plate $h$ at the opposite end of the collar to prod and prick the animal, and thereby restrain it from breaking the fence and forcing a passage through or over the fence.

In using two uniform half-collars having extensions and hooks $c$, (as shown in Fig. 3,) I simply hinge the short and perforated arm of one of the pieces to the long arm at the end of the bow $b$ of the other piece by means of one of my barbed coupling devices $g\ h\ i$, and then detachably connect the two pieces at the open end of the collar by means of another coupling device $g\ h\ i$, so that the extensions and hooks $c$ will extend in opposite directions from the bows and collar $b\ b$.

I claim—

1. The collar-coupling device $g$, having a barbed extension, $h$, and perforations $i\ i$, in combination with a jointed animal-collar, as and for the purposes set forth.

2. The improved animal-poke, composed of the bar A, having a central bow, $b$, and hooks or elbows $c$ at its ends, the half-collar D, and the barbed connecting devices $g\ h$, substantially as shown and described, to operate in the manner set forth.

LEWIS T. WING.

Witnesses:
GEO. M. MAXWELL,
J. M. BROWN.